Sept. 25, 1962  D. L. ERICKSON  3,055,298
RECORD SYSTEM AND COMPONENTS
Original Filed Oct. 6, 1956  3 Sheets-Sheet 3
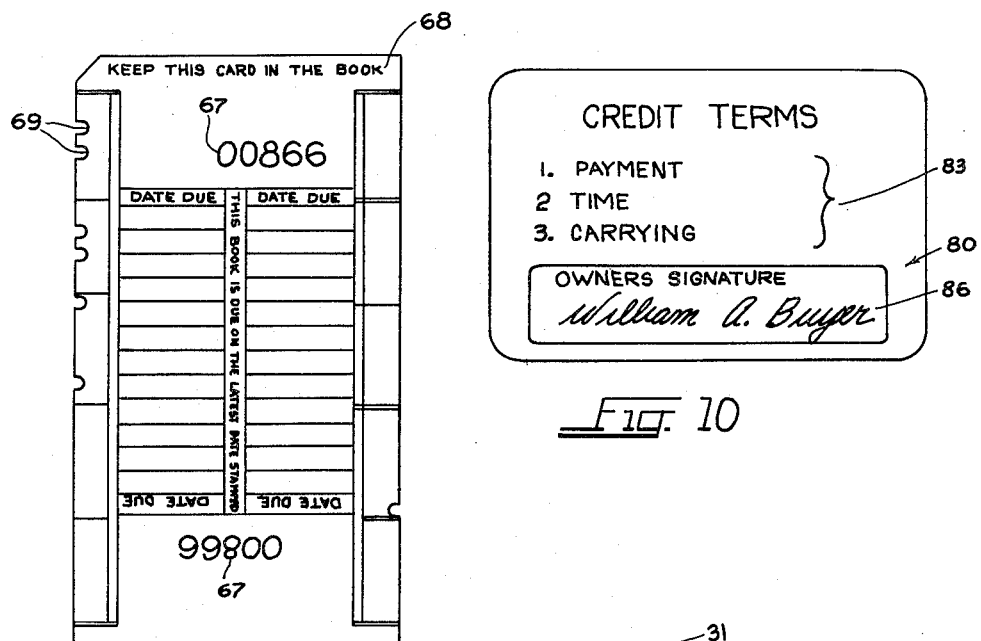
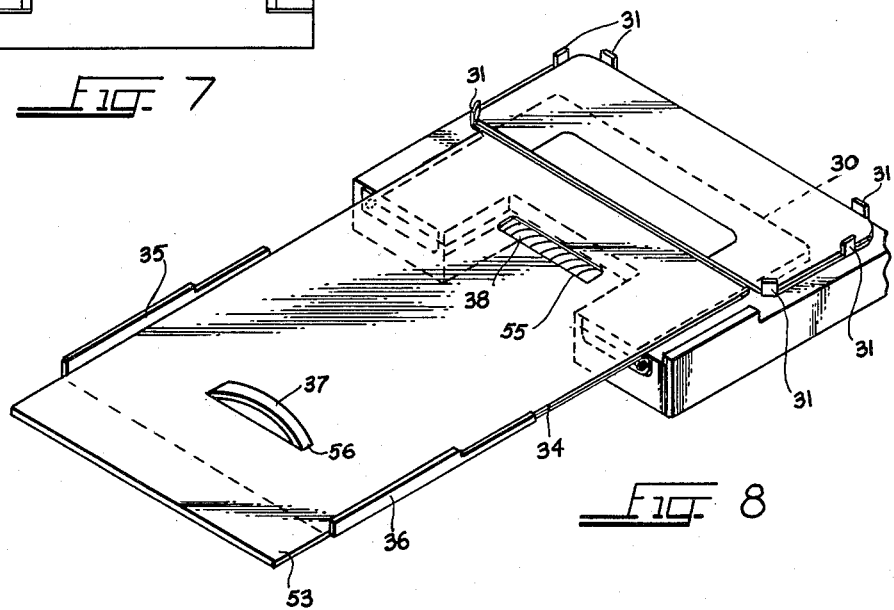
INVENTOR.
DONALD L. ERICKSON
BY Wallace and Cannon
Att'ys.

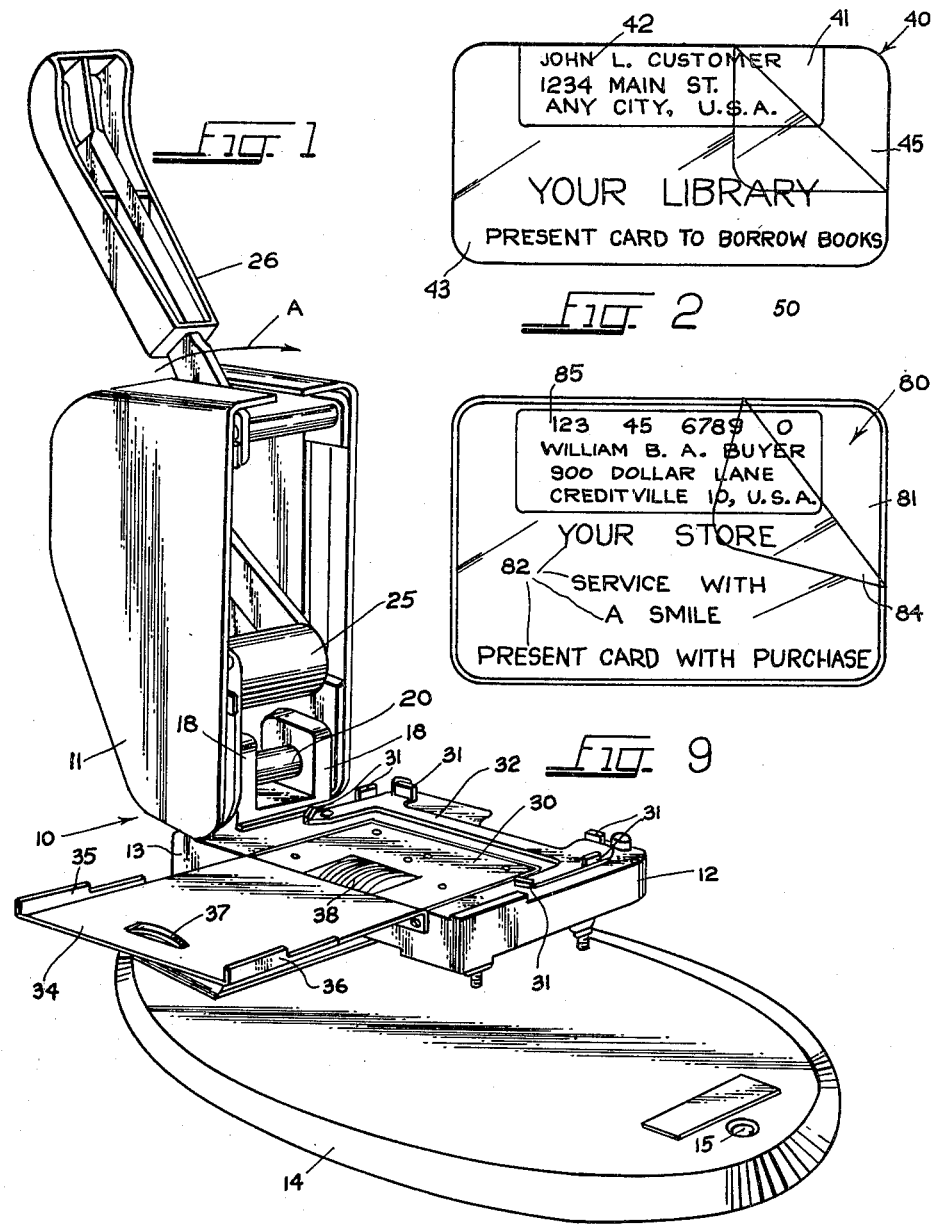

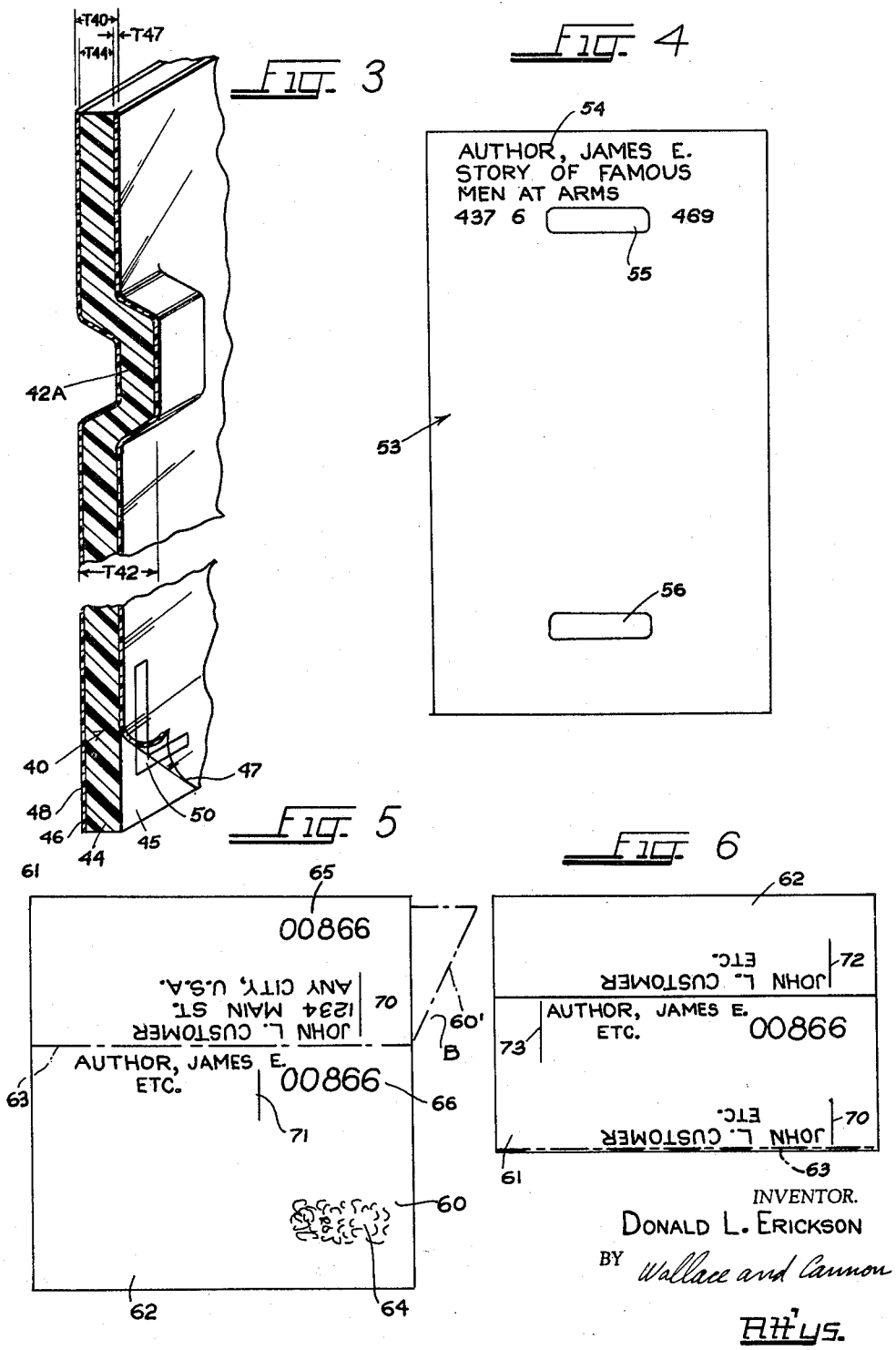

United States Patent Office 3,055,298
Patented Sept. 25, 1962

3,055,298
RECORD SYSTEM AND COMPONENTS
Donald L. Erickson, Syracuse, N.Y., assignor to Addressograph-Multigraph Corporation, Cleveland, Ohio, a corporation of Delaware
Original application Oct. 6, 1956, Ser. No. 615,170. Divided and this application Jan. 28, 1959, Ser. No. 789,649
4 Claims. (Cl. 101—426)

This invention relates to printing and recording apparatus. More particularly, the invention relates to a system of recording business transactions other than conventional sales, particularly those in which the lending of goods such as books, tools, and other types of equipment is involved. The present application is a division of copending application Serial No. 615,170, filed October 6, 1956, now abandoned.

Printing apparatus, usually in the form of relatively small hand-operated printing machines, has come into widespread use in the field of credit transactions in retail stores and in some other business situations where it is desirable to reproduce accurately and rapidly certain essential information relating to the party or parties involved in and other data relative to a given transaction. Typically, in conventional credit verification systems, each customer of a store or of a group of stores may be issued an individual printing device which is embossed with the name, address and other identifying information relating to the customer, such as an account serial number. Each time the customer makes a purchase under the account identified by this device the device is positioned in a printing machine which is then employed to imprint the embossed information upon a sales slip, contract or other record instrument. Printing is usually accomplished with a relatively small hand-operated printing machine which includes means for supporting the identification plate in a position in which the relief design on the plate may be engaged by one surface of a sheet of paper such as the sales slip or the like. A roller platen is then rolled across the opposite surface of the paper in pressure contact therewith to imprint the information carried by the identification plate on the instrument. An inked ribbon may be utilized in the machine to render the imprinted pattern visible and relatively permanent upon the paper; preferably, however, an ink-impregnated roller platen is utilized for this purpose.

There are a number of potential applications for identification plates similar to the familiar credit charge plates which present additional problems by virtue of the different nature of the business transactions involved. A typical example of a situation of this type is presented by the lending transactions of a library and by other similar business activities which require the lending and subsequent return of goods including books, tools, specialized equipment such as hospital beds, and the like. In these applications it is desirable to provide a record system which effectively eliminates the manual recording of data relating to individual transactions, yet maintains an accurate accounting of all of the goods on loan. Preferentially, such a recording system should provide for operation by relatively untrained personnel so that, in a library, for example, skilled personnel may be released for other and more important duties. Moreover, the recording system should afford means for an automatic check on the circulation of and demand for various goods employed in a lending business such as a library or the like in order to make it possible to determine which goods are most in use, and thereby permit additions to the stock on hand and/or elimination of goods for which little or no demand exists.

Accordingly, a principal object of the invention is a new and improved recording system, including both method and component concepts, for maintaining continuous records of lending or similar transactions.

A further specific object of the invention is a new and improved recording method and system which automatically provides for a check on the circulation of and demand for goods which are issued in a series of lending transactions.

An additional object of the invention is a new and improved recording system for library and other lending transactions which provides accurate, legible records using inexpensive equipment and components.

Thus, the invention is applied to a recording system utilizing a first series of printing devices, each embossed with information identifying an individual customer or user, a second series of printing devices, each embossed with information identifying goods, services, or the like, and a printing apparatus adapted to imprint information from a pair of these devices upon a single record sheet having two distinct record sections. In accordance with the inventive method concept, a pair of printing devices, one from each of the two aforementioned series, is placed in operative position in a printing apparatus. The record sheet is then positioned in the printing apparatus and is imprinted on one side with the information carried by both devices, the information from the two different devices appearing on different sections of the record sheet. The record sheet is then folded to expose the printed side of one section of the sheet adjacent a portion of the unprinted side of the other section of the sheet. Thereafter the sheet is again imprinted with the information carried by both devices; the information imprinted upon the two sections in this second printing step is different from that applied in the previous step. Of course it will be recognized that the sequence of operations set forth hereinabove is not critical; the record instrument may first be imprinted in folded form and subsequently opened up for the second printing step.

In its apparatus or component aspect, the recording system concept of the invention comprises a first series of printing devices, each embossed with information identifying an individual participant in the system, these devices having a size and configuration convenient for carrying on the person. The apparatus further includes a second series of printing devices, each embossed with information identifying individual goods, services, or the like which may be involved in a given transaction. The system further includes a hand-operated printing machine comprising a movable platen, a printing platform, means for removably mounting a pair of printing devices, including one device from each of the aforementioned series, in side-by-side relationship upon the printing platform, and means for actuating the platen to print information from both of the devices upon a single record sheet.

One particular printing device which forms an important part of the recording system concept of the invention comprises a thin, flat unitary plate of plastic which is dimensionally stable over a relatively broad temperature range and which has a predetermined fractional area embossed with data relating to the business transaction in which the device is employed. This printing device is provided with at least one aperture of predetermined dimensions in a preselected location adjacent the embossed area to permit projection of the type characters of a dating, numbering or like device through the device, thereby affording a means for reproducing the embossed information from the device simultaneously with additional information carried by the aforementioned type characters.

In a further embodiment the invention relates to a record instrument for use in a recording system including a printing machine adapted to print information from two printing devices simultaneously upon a single sheet of record-receiving material. In accordance with the inventive concept, the record instrument comprises a sheet of paper or the like and means affording a folding edge dividing said sheet into a record section and a tickler section.

One section of the instrument, usually the tickler section, is made substantially longer, in a direction normal to the folding line, than the second section to permit imprinting of information from both of the two printing devices upon the face side of the second section and upon the opposite sides of the first section with only two printing operations.

Other and further objects of the present invention will be apparent from the following description and claims and are illustrated in an accompanying drawing which, by way of illustration, shows preferred embodiments of the present invention and the principles thereof and what I now consider to be the best mode for applying these principles. Other embodiments of the invention embodying the same or equivalent principles may be used and structural changes may be made as desired by those skilled in the art, without departing from the present invention and the purview of the appended claims.

In the drawings:

FIGURE 1 is a perspective view of a printing machine adapted for use in conjunction with both the recording system and printing device concepts of the invention, the printing head of the machine being disposed in an elevated position;

FIGURE 2 is a plan view of a typical printing device or plate constructed in accordance with one embodiment of the invention and suitable for use in the inventive recording system;

FIGURE 3 is a greatly enlarged perspective view, in cross section, of the printing device of FIGURE 2;

FIGURE 4 is a plan view of a printing device constructed in accordance with another embodiment of the invention and adapted for use in the inventive recording system.

FIGURE 5 is a plan view of a record instrument corresponding to another embodiment of the inventive concept and suitable for use in the inventive recording system;

FIGURE 6 shows the record instrument of FIGURE 5 folded for use in accordance with another step in the inventive recording method;

FIGURE 7 illustrates another record instrument which may be employed in the inventive system in conjunction with the record instruments shown in FIGURES 5 and 6;

FIGURE 8 is a perspective view of a portion of the printing machine of FIGURE 1 showing the printing devices of FIGURES 2 and 4 mounted therein;

FIGURE 9 is a plan view of another embodiment of the printing device constructed in accordance with the present invention; and FIGURE 10 shows the reverse side of the printing device of FIGURE 8.

FIGURE 1 illustrates a printing machine 10 which is in many respects essentially similar to the hand-operated printing machines employed in credit-verification systems using individual embossed printing devices or identification plates. The printing machine comprises a movable printing head 11 which is mounted for vertical pivotal movement relative to a stationary printing platform 12 which serves to support a pair of printing devices in a manner to be described more completely hereinafter. The printing platform 12 is supported by a vertical column 13 which may comprise a separate element or may be formed as an integral part of a relatively large base 14. Base 14 may be provided with a counter-sunk opening 15 or other suitable means for mounting printing machine 10 upon a store counter or similar work surface; on the other hand, the weight of the printing machine itself may be relied upon to give it the necessary stability in use.

In the illustrated printing machine, the printing head 11 is pivotally supported on a pair of spaced upstanding support lugs 18 which may be formed as an integral part of printing platform 12 and which extend vertically upward from the rear or base portion of the printing platform. The pivotal connection between the printing head and support lugs 18 may be provided by a suitable shaft 20. Printing head 11 includes a roller platen 25 which is supported within the printing head and mechanically linked to an operating handle 26. The mechanical linkage between the operating handle and the roller platen is such that, when the handle is pulled forwardly and downwardly as indicated in the drawing by arrow A, the roller platen remains in the position shown in FIG. 1 until printing head 11 comes into contact with printing platform 12. Thereafter, continued movement of operating handle 26 in the direction indicated by arrow A pulls platen 25 across the printing platform under rolling pressure contact to perform the printing operations described in detail below. The mechanical linkage between the operating handle and the roller platen is not shown in the drawings, since many suitable examples of this type of operating apparatus are well known in the art and the present invention is not restricted to or based upon use of any specific printing mechanism insofar as the operation of the platen is concerned.

Printing platform 12 is provided with a substantially U-shaped anvil 30 which is employed to support a pair of printing devices or plates upon the printing platform. A series of guide elements 31 comprising ears or lugs projecting from a member 32 are mounted around the edge of the bright portion 33 of printing anvil 30; these guide elements may be employed to mount a first printing device (not shown in this figure) upon the printing platform. A platform extension member 34 is mounted upon platform 12 adjacent the open end of the anvil; platform extension 34 includes a pair of longitudinal guides 35 and 36 and a lateral guide element 37 which may be utilized in mounting a second printing device upon platform 12 in a manner to be described hereinafter. In addition, a dater or other numbering device or the like 38 is mounted upon printing platform 12 with the type characters or other indicia of the device extending above the open portion of the anvil in a position aligned with guide element 37.

The basic operational characteristics of printing machine 10 are essentially similar to those of the many hand printers currently in use in credit verification systems using individual printing devices to identify customers; accordingly, only a brief description of the operation of the printing machine is included in this specification. For a given transaction, a first printing device is mounted in the area defined by guide 31 and a second printing device is mounted on platform extension 34, the position of the second printing device being determined by guide element 37 along with guides 35 and 36 and dater 38. The two devices are so positioned that the embossed or other relief designs carried by them are located immediately adjacent each other and are disposed immediately above anvil 30. A record instrument, usually comprising a sheet of paper, is then placed over the two printing devices and operating handle 26 is moved in the direction indicated by arrow A to bring printing head 11 into contact with platform 12. Continued motion of the operating handle causes roller platen 25 to traverse the exposed surface of the record sheet in rolling pressure contact and thereby imprint upon the sheet with the information carried by the relief designs on the two printing devices.

As indicated above, an inked ribbon, carbon paper or other similar means may be employed to render material imprinted upon the record sheet visible and relatively permanent. Preferably, however, roller platen 25 comprises a self-inking roller platen which automatically inks the printed image without requiring a separate ink source. A preferred form of roller platen is fabricated from powdered or finely divided rubber particles bonded together with powdered or finely divided resin; preferably the resin employed is of the thermosetting type. These materials may be formed under heat and pressure to afford a hard but resilient platen having a multiplicity of extremely fine capillary passages which may be impregnated with ink and which will emit the ink evenly under relatively light printing pressures. A self-inking platen of this type is described in a co-pending application of John H. Gruver and Lester F. Mitchell, Serial No. 404,368 filed January 15, 1954, now abandoned, and a preferred method of manufacturing a porous rubber-resin composition of this type is described in detail in application Serial No. 335,084 filed February 4, 1953, now U.S. Patent No. 2,763,208. A preferred construction for the platen which affords a means for compensating for variations in thickness of the individual printing devices employed in machine 10 is described and claimed in the co-pending application of John A. Maul, Serial No. 607,102, filed August 30, 1956, now U.S. Patent No. 2,982,205.

FIGS. 2 and 3 illustrate a preferred construction for the individual identification plate or printing device which is utilized in printing machine 10 to identify a particular customer, borrower or other person involved in a given transaction. The printing device 40 shown in these two figures constitutes a preferred form of printing plate to be employed in the recording system set forth in detail hereinafter and represents one of the important inventive concepts of the present invention. As indicated in FIG. 2, printing device 40 may conform in size and configuration to an ordinary identification card such as those frequently employed for credit and other purposes. One fractional portion 41 of the surface area of device 40 is embossed with type characters which represent identification data concerning an individual participant in the recording system. For example, as indicated at 42 in the drawing, this information may comprise the name and address of the individual; in addition an account serial number or other pertinent information may be embossed into section 41 of printing device 40. The remaining area of the printing device, section 43, is imprinted with other information relating to the business transactions in which device 40 is to be employed. For example, printing device 40 may comprise an identification card to be used by a library in the process of lending books, in which case section 43 of the device is imprinted with the name and address of the library; in addition, section 43 may be imprinted with further information relating to the terms and conditions under which books are released to the user and other pertinent data. Of course, it will be understood that card 40 is not restricted to use in a library or other particular application; in fact, the card structure illustrated in FIGS. 2 and 3 is equally applicable to conventional credit-verification systems and to other business applications.

Printing device 40 includes a thin, flat unitary base plate 44 of plastic. The plastic material from which plate 44 is fabricated should be one which is dimensionally stable over a relatively broad temperature range; for example, the plastic should not become soft or tend to deform within a minimum temperature range of at least 0° to 110° Fahrenheit, since the cards or printing devices are normally carried upon the person of the user and may be employed in a wide variety of climates and/or special environments. In fact, the plastic from which plate 44 is formed is preferably one which is dimensionally stable over a range of at least −30° to 160° Fahrenheit.

The two opposed surfaces 45 and 46 of plate 44 are each covered with a thin, transparent plastic film, the film covering surface 45 being designated by reference numeral 47 in the drawing and that covering surface 46 by numeral 48. The two plastic films 47 and 48 are both substantially thinner than plate 44; for example, the thickness $T44$ of plate 44 may be of the order of 0.014 inch, whereas the thickness $T47$ of film 47 may be of the order of 0.002 inch in a typical instance, making the overall thickness $T40$ of the laminar blank from which printing device 40 is formed approximately 0.018 inch.

Before the two plastic films 47 and 48 are applied to printing device base plate 44, however, the printed information identifying the library, store or other organization issuing the printing device is printed directly upon surface 45 of plate 44, as shown at 50 in the drawings. The printed material 50 may be applied to plate 44 by any conventional means known in the graphic arts; for example, a letterpress, offset, lithographic, intaglio, or any other process may be employed, including an electrostatic and/or other method for obtaining a visible image upon the surface 45. After data 50 has been applied to surface 45, film 47 is bonded to base plate 44 by some process which will not destroy the printed information; usually, where the plastics used for the film and base plate elements are the same, this may be accomplished by heat and pressure techniques without adversely affecting the printed material. Film 48 may be applied to the base plate 44 either before or after the printed information and film 47 are bonded thereto provided, however, that if any printed information is to be carried by the reverse surface 46 of the printing device, the protective film 48 must be applied to base plate 44 after the printing operation on surface 46. If no printed information is to be carried by the reverse surface 46 of the device, then protective film 48 may be dispensed with entirely.

In accordance with the procedure outlined above, the laminar instrument blank comprising base plate 44 with printed information as indicated at 50 covered by protective film 47 and with a second protective film 48 covering printed information on the reverse surface, if desired, is completely fabricated before any individual identification data is incorporated into the printing device. The laminar instrument blank is then embossed in area 41 to form the printing type characters or relief design 42, generally represented in FIG. 3 by the embossure 42A. Thus, it is the entire laminar instrument blank which is embossed with the desired printing information. It is important that this particular sequence of steps be observed in preparing printed device 40. By following this procedure, printed material 50 is completely protected against damage or obliteration and therefore carries the identification and/or advertising message of the store, library, or the like for the life of the printing device. By embossing the printing device after lamination is complete, the protective films are prevented from obscuring the embossed information, thereby assuring sharp and legible reproduction of that information when the printing device is employed in printing machine 10 (FIG. 1). With at least some plastic materials, the embossing of the printing device may be accomplished in standard embossing machines currently employed for embossing metal plates provided the heating elements of the embossing machines are maintained inactive; for example, a vinyl chloride laminar structure having the dimensions set forth above may be easily embossed in many of the standard commercial Graphotype machines manufactured by the Addressograph-Multigraph Corporation, specifically including those identified by the designations Series 6150, Series 6250, Series 6340 Regular, and Series 6740 Inverted.

Construction of printing device 40 in the manner set forth above and using a suitable dimensionally stable plastic such as vinyl chloride provides a credit or other identification device which is extremely durable and very light in weight and which is therefore readily adapted to carrying upon the person of the customer or other participant in the recording system in which the device is used. The printing device 40 is quite inexpensive, particularly in comparison with comparable metal devices, and presents a very attractive appearance, since the range of colors and designs available is virtually infinite. Of equal importance is the fact that the instrument may be embossed by relatively inexpensive standard equipment and thus does not require processing at a factory location; this feature adds materially to the economic advantages of the printing device. It should be noted that the overall thickness of card or printing device 40 after embossing, which is indicated in the drawings as dimension T42, is not particularly critical; in a preferred form of printing device this dimension is of the order of 0.036 inch.

FIG. 4 illustrates a second printing device 53 which in some respects is quite similar to the device 40 described above in connection with FIGS. 2 and 3. Printing device 53 is employed in the inventive system to identify goods, services or the like which may be involved in any given transaction; in the specific embodiment of the inventive recording system to be described hereinafter device 53 is employed to identify individual books in a library. This printing device is preferably fabricated from a dimensionally stable plastic such as vinyl chloride and is embossed at one end with information relating to an individual book as indicated in the drawing at 54. In this instance, there is no necessity for providing printed material upon the printing devices, since it is not utilized for advertising or similar purposes and remains to a substantial degree under the control of the library, store or other organization operating the recording system. Consequently, printing device 53 need not be of the laminar construction described in connection with FIGS. 2 and 3 but may comprise a single unitary sheet of plastic suitably embossed. Of course, in a given system it is preferable that the plastic material selected for printing device 53 have characteristics substantially similar to those of the laminar blank which is embossed to form printing device 40, since the two different types of printing device may then be embossed in a single embossing machine.

Printing device 53 is provided with two apertures 55 and 56. One of these apertures 55 is located immediately adjacent embossed material 54; it is through this aperture that the type characters of the dater 38 project when printing device 53 is mounted in platform extension 34 of printing machine 10 (FIG. 1). The second aperture 56 is located in the card at a position which will permit it to engage guide element 37 of the printing machine when printing device 53 is employed therein. Preferably, apertures 55 and 56 are located at corresponding positions at the two ends of printing device 53 so that, after a particular book or other item involved in the recording system is removed from circulation, the printing device may be re-embossed with new information at the opposite end thereof and re-used in connection with a second and perhaps completely different book.

FIGS. 5 and 6 show a record instrument which is employed in the inventive recording system and which can best be explained in conjunction with FIG. 7. The record instrument 60 shown in FIG. 5 comprises a sheet of paper or other suitable print-receiving material which is divided into two distinct sections 61 and 62 by a perforated folding edge 63. Section 61 comprises the record or permanent information portion of the instrument 60, whereas section 62 constitutes a tickler or reminder section. For reasons which will be made more apparent hereinafter, tickler section 62 may be made approximately the same size as a conventional postal card, and the entire record instrument 60 may be fabricated from ordinary paper stock such as sixteen-pound sulphite paper.

Tickler section 62 of instrument 60 may be imprinted with suitable legends indicating the purpose of the reminder; for example, in the illustrated embodiment, which is intended for use in a library system, the legend may indicate that the recipient of the tickler section is in possession of an overdue book which should be returned. Other suitable printed material may be applied to the tickler section of the instrument, depending upon the particular business arrangement or other environment in which the system is employed. In addition, both sections of instrument 60 are preferably imprinted with a serial number or other identification designation such as shown at 65 and 66 in FIG. 5. These identification designations are made to correspond to similar indicia 67 upon an additional series of record cards 68 illustrated in FIG. 8 and employed in the system as applied to library work. Each of record cards 68 is serially numbered and is punched as indicated at 69 to permit mechanical sorting of the record cards; any of the several punching systems and related mechanical sorting systems known in the art may be employed in connection with record instrument 68, which in a library system constitutes a permanent date due record. The date due cards 68 are used repetitively in the system, whereas instruments 60, which comprise individual transaction records, are expendable and are individual to each transaction.

To establish the inventive recording system in a library, each authorized borrower is issued an individual identification printing device such as printing device 40 described above in connection with FIGS. 2 and 3. A further series of individual printing devices corresponding to plate 53 of FIG. 4 is prepared and these devices are individually associated with the books of the library; in other words, a printing device 53 is prepared for each book in the library and is preferably inserted in the usual book card envelope. A permanent set of serially numbered and suitably punched permanent date due cards 68 is prepared, and, preferably, several sets of expendable transaction instruments 60 for use with the permanent date due cards and bearing corresponding serial numbers are prepared. Differently colored date due and transaction cards may be employed for different periods of book issuance, in those instances where the library permits the user to have different books for varying periods; alternatively, color coding may be employed to indicate a branch or department of the library from which a book has been issued.

When a borrower presents a book to be charged out, he must present his individual identification plate 40 to be used in the transaction. Plate 40 is mounted upon printing platform 12 of a hand-operated printing machine such as that shown in FIG. 1 in the position indicated in the detail view of FIG. 8. The individual book printing plate 53 is then removed from the book and mounted upon extension 34 of printing platform 12 as indicated in FIG. 8, with the type characters of dater 38 extending through aperture 55 in the printing plate and with guide element 37 extending through aperture 56. The expendable transaction card 60 is then placed over printing devices 40 and 53 and the printing machine is actuated to print upon instrument 60 a first impression of the information carried by the two printing devices. These two impressions are indicated at locations 70 and 71 in FIG. 5; as shown therein, the information from printing device 40 is printed upon record section 61 and the information from book printing device 53 is applied to tickler section 62.

After the first printing impression has been made, instrument 60 is folded along folding edge 63 to the position shown in FIG. 6. It is then again placed in the printing machine over printing devices 40 and 53 and a second impression of the information carried by the two printing devices is taken. The method of folding the record instrument is indicated in FIG. 5 by dash outline 60' and arrow "B." The second imprinting operation applies the customer identification information from printing device 40 to the reverse side of tickler section 62, as indicated in FIG. 6 by reference numeral 72, and at the same time prints the book identification information from device 53 upon record section 61 of the transaction record instrument as indicated at 73. Of course, the date of the transaction appears on both sections of record instrument 60, since the dater projecting through aperture 55 of printing device 53 also takes part in the printing operation. At the same time the correspondingly numbered permanent date due card 68 is inscribed with the date of the transaction. The book-identification printing device 53 and the date due card 68 are then placed in a suitable pocket in the book and the individual identification card 40 is returned to the borrower. The transaction card 60 is sent to the records section of the library.

The return of books under the inventive recording system is equally simple in operation. When a book is offered for return, the date due card 68 is removed and checked to determine if any charges are due. Card 68 is then placed with other date due cards of the same color. Subsequently, the cards may be mechanically sorted into numerical sequence and checked for missing cards. The missing cards indicate which of the transaction cards 60 retained in the library records section represent overdue books. For books which have been returned on time, the transaction cards may be discarded. When a check of the date due cards indicates that certain books are overdue, however, the tickler sections 62 of the transaction cards may be mailed out to the library patrons in window envelopes, since they constitute automatically completely addressed overdue book notices. The record sections 61 of thesee cards may be retained in an overdue file until each book is returned.

Record analysis in the inventive system is also extremely simple. After each book has been charged out, the two-section transaction instruments 60 are sent to a central location for record control, preferably on a daily basis. The pre-addressed and numerically sequenced transaction instruments 60 are filed by their due date; since these instruments are received in color groups and in numerical sequence, no sorting is required. These transaction cards may then be employed in compiling circulation records and to afford an accurate inventory record for the library.

The recording system set forth above, as applied to a library, affords completely accurate and legible records of all transactions and reduces the manual aspects of the recording operation to a bare minimum. By providing an effective and efficient means for preparing charge records and overdue notices simultaneously with the charging out of the books, the system affords a very substantial reduction in the work required for this aspect of library management and at the same time improves customer relations in that it does not delay the borrower at the time the book is charged out. The operations required are extremely simple and may be performed by untrained personnel, thereby releasing professional members of the library staff for more important duties. The recording system affords automatically prepared records which provide an accurate picture of circulation of the library's books. Of the greatest importance is the fact that the entire system requires only a relatively small expenditure for printing devices and the printing machines associated with those devices and utilizes printing devices which may be easily prepared in their final form by conventional commercial embossing machines.

Of course it will be understood that the embodiment of the inventive recording system described above is illustrative only and that wide variations may be made without departing from the inventive concept. For example, although the plastic printing devices described in connection with FIGS. 2 and 3 afford a highly economical and attractive element of the system, they may, without departing from the recording system concept of the invention, be replaced by metal printing plates such as those currently used in a number of credit-verification systems. By the same token, metal printing plates may be affixed to conventional book cards as a replacement for the book-identification printing devices 53 of the system as described. Moreover, as indicated above, any of the many well-known printing machines currently employed in credit-verification or similar systems may be substituted for printing machine 10, usually with only minor modification, without departing from the purview of the invention.

In addition to its highly desirable characteristics in a library or similar lending operation, the basic construction of printing device 40 may be adopted to equal advantage in a more conventional credit-verification system. In systems of this type, the relatively simple card structure shown in FIGS. 2 and 3 may be employed; on the other hand, it may be desirable to enlarge the printing device slightly and to add information in the form of additional printed and/or embossed characters to it. A card of this type is illustrated in FIGS. 9 and 10 and comprises a printing device 80 which is essentially similar in basic structural features to card 40 of FIGS. 2 and 3. Thus, card 80 is of laminar construction and includes a basic plastic plate 81 which may be imprinted on both sides with information such as the name of the store or other organization issuing the printing device, the terms under which credit is permitted, and other similar information. As in the previously described embodiment, this printed material, which is indicated by reference numerals 82 and 83 in FIGS. 9 and 10 respectively, is applied to the plastic plate 81 and is subsequently covered with a thin, transparent plastic film 84 as indicated in FIG. 9. Thus, a printed laminar instrument blank is formed and this blank is subsequently embossed, as indicated at 85 in FIG. 9, with the requisite information identifying an individual customer participating in the credit system. In addition, a further panel 86 for receiving the signature of the person identified by the embossed information may be applied to the printing device as indicated in FIG. 10. Panel 86 may comprise a strip of plastic or other suitable material which is relatively porous in nature and therefore capable of receiving and retaining a written signature and may be bonded to the printing device by any suitable technique.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a record system including a first series of printing devices each embossed with information identifying an individual, a second series of printing devices each embossed with information identifying goods, services, or the like, and a printing apparatus adapted to imprint a single record sheet having two distinct record sections from a pair of devices, one from each series, the method of printing said record sheets comprising: placing a pair of printing devices, one from each series, in operative position in said printing apparatus; imprinting one side of said sheet with the information carried by both said devices, the information carried by said devices appearing on different sections of said sheet; folding said sheet to expose said one side of one section of said sheet adjacent a portion of the other side of the other section of said sheet; and again imprinting said sheet with the information carried by both said devices, the information imprinted on each of said sections being different in the two printing steps.

2. In a record system including a first series of printing devices each embossed with information identifying an individual, a second series of printing devices each embossed with information identifying goods, services, or the like, and a printing apparatus adapted to imprint a single record sheet comprising a tickler section and a record section from a pair of devices, one from each series, the method of printing said record sheets comprising: placing a pair of printing devices, one from each series, in operative position in said printing apparatus; imprinting one side of said sheet with the information carried by both said devices, the information carried by said device from said first series appearing on said record section of said sheet and the information from said device of said second series appearing on said tickler section; folding said sheet to expose said one side of one section of said sheet adjacent a portion of the other side of the other section of said sheet; and again imprinting said sheet with the information carried by both said devices, the information imprinted on each of said sections being different from that imprinted in the preceding printing step.

3. In a record system including a first series of printing devices each embossed with information identifying an individual, a second series of printing devices each embossed with information identifying goods, services, or the like, and a printing apparatus adapted to imprint a single record sheet comprising a tickler section and a record section from a pair of devices, one from each series, the method of printing said record sheets comprising: placing a pair of printing devices, one from each series, in operative position in said printing apparatus; folding said sheet to expose one side of one section of said sheet adjacent a portion of the other side of the other section of said sheet; imprinting the exposed sections of said sheet with the information carried by both said devices, the information carried by said devices appearing on different sections of said sheet; unfolding said sheet; and again imprinting said sheet with the information carried by both said devices, the information imprinted on each of said sections being different from that imprinted in the preceding printing step.

4. A record system comprising: a first series of printing devices each embossed with information identifying an individual participant in the system, said device having a size and configuration convenient for carrying on the person; a second series of printing devices each embossed with information identifying individual goods, services, or the like which may be involved in a given transaction and having a pair of guide apertures located at opposite ends thereof; and a hand-operated printing machine including a movable platen, a printing platform, means for removably mounting a device from said first series on said platform, a dater mounted on said platform, means including a guide lug for engaging one of said guide apertures in a device from said second series for removably mounting said second series device on said platform with a portion of said dater projecting through the other of said guide apertures, and means for actuating said platen to print information from both of said devices upon a single record sheet.

References Cited in the file of this patent
UNITED STATES PATENTS

| | | |
|---|---|---|
| 961,829 | Woolridge | June 21, 1910 |
| 1,801,597 | Dugdale | Apr. 21, 1931 |
| 1,858,273 | Keene | May 17, 1932 |
| 1,921,511 | Elliott | Aug. 8, 1933 |
| 2,055,418 | Ohlsen | Sept. 22, 1936 |
| 2,366,998 | Bruce | Jan. 9, 1945 |
| 2,576,490 | Trumbull | Nov. 27, 1951 |
| 2,598,161 | Gruver | May 27, 1952 |
| 2,606,494 | Vogt | Aug. 12, 1952 |
| 2,656,788 | Werner | Oct. 27, 1953 |
| 2,694,975 | Garver | Nov. 23, 1954 |
| 2,730,041 | Russel | Jan. 10, 1956 |
| 2,795,186 | Bach | June 11, 1957 |
| 2,935,939 | Doherty et al. | May 10, 1960 |